US008938786B2

(12) United States Patent
Cheng et al.

(10) Patent No.: US 8,938,786 B2
(45) Date of Patent: Jan. 20, 2015

(54) SYSTEM AND METHOD FOR USING A DECLARATIVE APPROACH TO ENFORCE INSTANCE BASED SECURITY IN A DISTRIBUTED ENVIRONMENT

(75) Inventors: Michael Cheng, Austin, TX (US); Vishwanath Venkataramappa, Austin, TX (US); Tom Zhongyu Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2505 days.

(21) Appl. No.: 11/622,698

(22) Filed: Jan. 12, 2007

(65) Prior Publication Data

US 2008/0172727 A1 Jul. 17, 2008

(51) Int. Cl.
*G06F 21/00* (2013.01)
*G06F 21/62* (2013.01)

(52) U.S. Cl.
CPC .... *G06F 21/6227* (2013.01); *G06F 2221/2141* (2013.01)
USPC ................ 726/7; 726/1; 726/2; 726/3; 726/5; 713/165; 713/166; 713/167; 713/193

(58) Field of Classification Search
USPC ............... 726/1, 2, 3, 5, 7; 713/165–167, 193
See application file for complete search history.

(56) References Cited

U.S. PATENT DOCUMENTS 5,765,153 A 6/1998 Benantar et al. .................. 707/9
6,606,711 B2 8/2003 Andrews et al. .............. 713/201
2003/0115487 A1* 6/2003 Andrews et al. .............. 713/201
2004/0054696 A1* 3/2004 Sheinis et al. ................ 707/201
2005/0015591 A1 1/2005 Thrash et al. ................. 713/166
2005/0182966 A1 8/2005 Pham et al. ................... 713/201
2005/0257244 A1 11/2005 Joly et al. .......................... 726/1

OTHER PUBLICATIONS

Manfred Broy, "Declarative Specification and Declarative Programming", IEEE, 1991, pp. 2-11.*
Damianou et al., "The Ponder Policy Specification Language," Proc. Policy 2001: Workshop on Policies for Distributed Systems and Networks, Jan. 2001.
"Brivo ACS Information Security," Brivo Systems Inc., White Paper, Mar. 5, 2003.

(Continued)

*Primary Examiner* — Kambiz Zand
*Assistant Examiner* — Tongoc Tran
(74) *Attorney, Agent, or Firm* — VanLeeuwen & VanLeeuwen; Jeffrey S. LaBaw

(57) ABSTRACT

A system and method for using a declarative approach to enforce instance based security in a distributed environment is presented. The invention described herein includes security logic in declarative specifications that, in turn, decouples the security logic from distributed object administration logic. An access manager identifies access requirements by combining object name property keys included in a distributed object with property key specifications included in a declarative specification. In turn, the access manager compares a caller's access attributes with the access requirements to determine whether to create a distributed object instance and allow the caller to invoke a method on the distributed object instance. The access requirements may also include role specifications and method parameter specifications.

20 Claims, 10 Drawing Sheets

(56) References Cited

OTHER PUBLICATIONS

Pavlich-Mariscal et al., "A Formal Enforcement Framework for Role-Based Access Control Using Aspect-Oriented Programming," Dept. of Computer Science & Engineering, The University of Connecticut, 2005.

Hao et al., "An Aspect-Oriented Approach to Distributed Object Security," Computer Sciences Dept., Purdue University, 1999.

Reichmann et al., "Meta Objects for Access Control: Extending Capability-Based Security," Proceedings of ACM New Security Paradigms Workshop 97, 1997.

* cited by examiner

200 cluster=cluster1,server=server1,host=host1

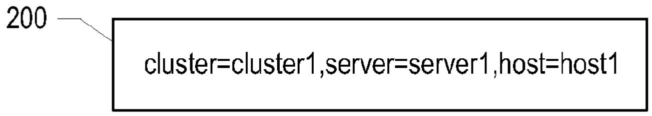

```
<MBean>
  ...
  <InstanceSecurity>                                          230
    ┌─ ─ ─ ─ ─ ─ ─ ─ ─ ─ ─ ─ ─ ─ ─ ─ ─ ─ ─ ─ ─ ─ ─ ─ ─ ─ ─ ┐
    │ <propertyKeyInObjectName>cluster</propertyKeyInObjectName> │
    │ <resourceType>Cluster</resourceType>                      │
    └─ ─ ─ ─ ─ ─ ─ ─ ─ ─ ─ ─ ─ ─ ─ ─ ─ ─ ─ ─ ─ ─ ─ ─ ─ ─ ─ ┘
  </InstanceSecurity>
  ...
</MBean>
```

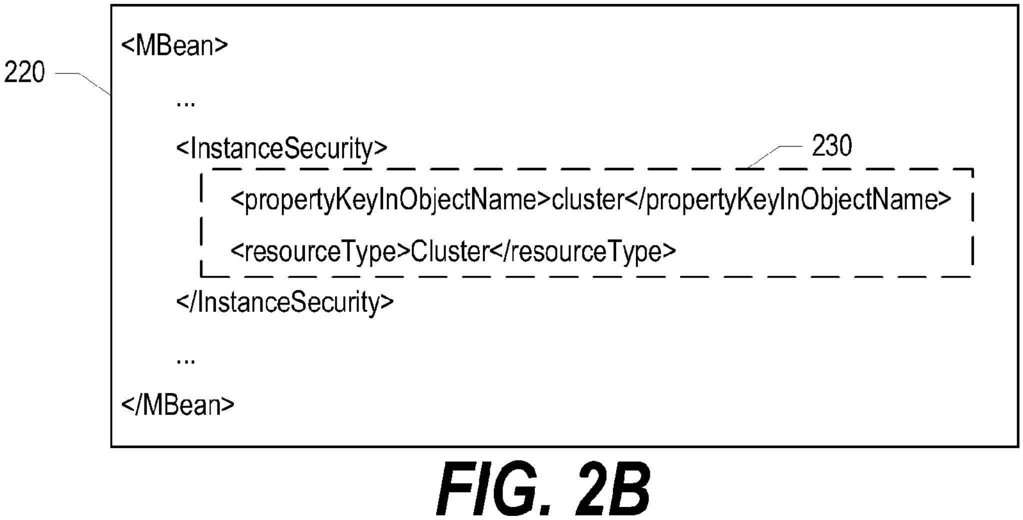

```
<MBean>
  ...
  <InstanceSecurity>                                          260
    ┌─ ─ ─ ─ ─ ─ ─ ─ ─ ─ ─ ─ ─ ─ ─ ─ ─ ─ ─ ─ ─ ─ ─ ─ ─ ─ ─ ┐
    │ <propertyKeyInObjectName>cluster</propertyKeyInObjectName> │
    │ <resourceType>Cluster</resourceType>                      │
    └─ ─ ─ ─ ─ ─ ─ ─ ─ ─ ─ ─ ─ ─ ─ ─ ─ ─ ─ ─ ─ ─ ─ ─ ─ ─ ─ ┘
  </InstanceSecurity>
  <InstanceSecurity>                                          270
    ┌─ ─ ─ ─ ─ ─ ─ ─ ─ ─ ─ ─ ─ ─ ─ ─ ─ ─ ─ ─ ─ ─ ─ ─ ─ ─ ─ ┐
    │ <propertyKeyInObjectName>host</propertyKeyInObjectName>   │
    │ <resourceType>Machine</resourceType>                      │
    └─ ─ ─ ─ ─ ─ ─ ─ ─ ─ ─ ─ ─ ─ ─ ─ ─ ─ ─ ─ ─ ─ ─ ─ ─ ─ ─ ┘
  </InstanceSecurity>
  ...
</MBean>
```

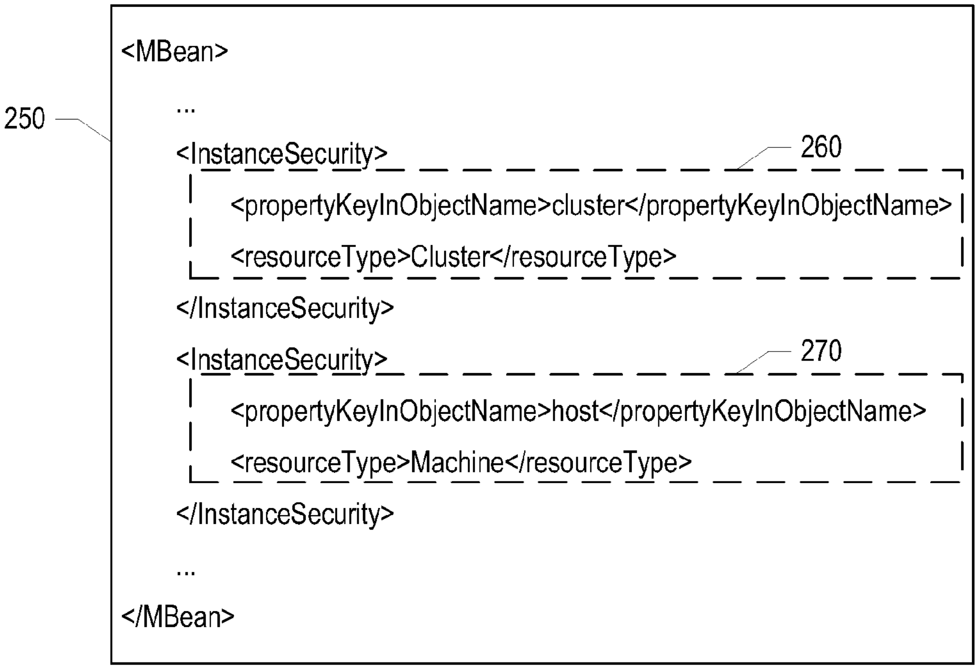

```
<MBean>
    ...
    <InstanceSecurity>
        <propertyKeyInObjectName>cluster</propertyKeyInObjectName>
        <resourceType>Cluster</resourceType>
        <role>Administrator</role>
        <role>Operator</role>
    </InstanceSecurity>
    ...
</MBean>
```

```
<MBean>
    ...
    <method name="method1">
        <parameter>
            <name>server1</name>
            <type>String</name>
            <resourceType>Server</resourceType>
            <role>Operator</role>
        </parameter>
        <parameter>
            <name>server2</name>
            <type>String</name>
            <resourceType>Server</resourceType>
            <role>Operator</role>
        </parameter>
        <parameter>
            <name>otherParam</name>
            <type>int</name>
        </parameter>
    </method>
```

```
<MBean>
  ...
  <method name="method1">
     <parameter>
           <name>node</name>
           <type>String</name>
     </parameter>
     <parameter>
           <name>server</name>
           <type>String</name>
     </parameter>
      ...
     <!-- A server is identified by combining the node and server parameters, for those cases
         where server name is insufficient, e.g., node1/server1 vs node2/server1. -->
     <combinedParameters>
              <parameter>node</parameter>
               <parameter>server</parameter>
               <resourceType>Server</resourceType>
               <role>Operator</role>
      </combinedParameters>
   </method1>
```

```
<MBean>
    ...
    <excludeAccessCheck>true</excludeAccessCheck>
    ...
</MBean>
```

```
<MBean>
    ...
    <method name="method1">
        <excludeAccessCheck>true</excludeAccessCheck>
    </method>
</MBean>
```

```
<MBean>
    <runAs role="system"/>
    ...
</MBean>
```

```
<MBean>
    <method name="method1">
    <runAs role="system"/>
    ...
    </method>
</MBean>
```

```
<MBean>
    <InstanceSecurity>
        <propertyKeyInObjectName>cluster</propertyKeyInObjectName>
        <resourceType>Cluster</resourceType>
        <role>Administrator</role>
    </InstanceSecurity>
    <method name="method1">
    ...
    </method>
    <method name="method2">
        <parameter>
            <name>serverParam</name>
            <type>String</type>
            <resourceType>Server</resourceType>
            <role>Operator</role>
        </parameter>
    </method>
    <method name="method3">
        <exclueAccessCheck>true</excludeAccessCheck>
        ...
    </method>
</MBean>
```

*FIG. 6*

SYSTEM AND METHOD FOR USING A DECLARATIVE APPROACH TO ENFORCE INSTANCE BASED SECURITY IN A DISTRIBUTED ENVIRONMENT

BACKGROUND OF THE INVENTION

1. Technical Field

The present invention relates to a system and method for using a declarative approach to enforce instance based security in a distributed environment. More particularly, the present invention relates to a system and method for decoupling security logic from distributed object administration logic by including the security logic in declarative specifications that, in turn, is combined with object name property keys to determine whether to grant access to a caller for a particular distributed object.

2. Description of the Related Art

When managing a distributed system consisting of large number of manageable resources, the system grants a user access to only those resources that the user is responsible for managing. Granting a user access to a subset of the resources within a system is referred to as "instance based security" because the user only has access to specific instances of the resources. Typically, the system performs instance based security by partitioning the resources into resource groups and granting users access to a resource group. In addition, in order to allow easier user management, a user may also belong to user groups. When a user group is granted access to a resource group, all users within the user groups are granted access to the resource group.

Users typically interact with a system either through a graphics front end, a command line tool, or a programmatic API (Application Program Interface). Eventually, these interactions result in calls to a distributed object that performs the user's request, such as creating new resources, modifying a resource being managed, or monitoring resources. For example, a JMX (Java Management Extension) specification specifies a distributed object implementation and, in this implementation, a distributed object may represent or interact with one or more resource instances. Each distributed object invocation first requires verification that the user has access to the resources for which the distributed object interacts or represents.

Typically, distributed object implementations are generic enough that a single implementation may be instantiated multiple times (e.g., one instance for each resource "type" in a system). For example, a distributed object implementation that represents a resource of type server may be used to represent actual server instances "server1" and "server2". In another example, the distributed object implementation may use parameters that represent resources in the system, and operate on those resources. For example, a distributed object implementation may use "server1" and "server2" as parameters, and perform operations on both servers.

In an instance based security environment, the distributed object implementation requires additional logic to ensure that the user performing the invocation has access to the actual instance of the resource for which it operates or represents. A challenge found with existing art is that it is limited to a "type" based declarative security specification. That is, the declarative security specification applies to every instance of a given type. In addition, a challenge found is there is less freedom to implement policy changes after the fact because the security logic is coupled with the distributed object administration logic.

What is needed, therefore, is a system and method that provides instance based declarative security specifications and decouples security logic from administration logic in a distributed object environment.

SUMMARY

It has been discovered that the aforementioned challenges are resolved using a system and method for including security logic in declarative specifications that are used in combination with object name property keys in order to determine caller access for a distributed object. In one exemplary embodiment, an access manager identifies access requirements by combining property keys included in a distributed object's corresponding object name with property key specifications included in a declarative specification. In turn, the access manager uses the access requirements to determine whether to create a distributed object instance and allow a caller to invoke a method on the distributed object instance. The access requirements may also include role specifications and method parameter specifications when applicable.

A caller sends a query request to an access manager, which manages access to distributed objects. Each distributed object has a corresponding object name that includes one or more property keys. The property keys are used in combination with a corresponding declarative specification to determine whether to create an instance of the distributed object and allow the caller to invoke a method on the distributed object instance.

The access manager receives the query request, and sends a response to the caller that includes object name properties corresponding to the query request. In turn, the caller sends an object request to the access manager, which is a call to request access to a particular distributed object. The access manager receives the object request and identifies a corresponding distributed object and object name. The access manager selects a corresponding declarative specification, and extracts a property key specification from the declarative specification. The property key specification includes resource type specifications and resource value specifications that are used to determine access requirements of the caller.

In turn, the access manager extracts property keys from the object name, and identifies access requirements by combining the property key specification with the property keys. Once the access manager identifies the access requirements, the access manager compares caller attributes against the identified access requirements to determine whether to grant access to a requested distributed object. In addition, the access manager may use role specifications and/or method parameter specifications as access requirements. When the access manager grants access, the access manager invokes a distributed object instance, which is an instance of the distributed object, and allows the caller to invoke a method on the distributed object instance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 2A is an exemplary object name that includes a plurality of property keys, each of which including a resource type and a resource value;

FIG. 2B is an exemplary declarative specification including one property key specification;

FIG. 2C is an exemplary declarative specification including two property key specifications FIG. 3A is an exemplary declarative specification including property key specifications and role specifications;

FIG. 3B is an exemplary declarative specification including method parameter requirements;

FIG. 4 is an exemplary declarative specification including multiple parameter type requirements;

FIG. 5A is an exemplary declarative specification showing that no security checks will be performed on behalf of any distributed object;

FIG. 5B is an exemplary declarative specification showing that no security checks are to be performed on behalf of a particular distributed object;

FIG. 5C is an exemplary declarative specification showing a distributed object switching roles;

FIG. 5D is an exemplary declarative specification showing a distributed object switching roles at a method level;

FIG. 6 is an exemplary declarative specification including a precedence ordering for determining which rule to apply to a distributed object;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
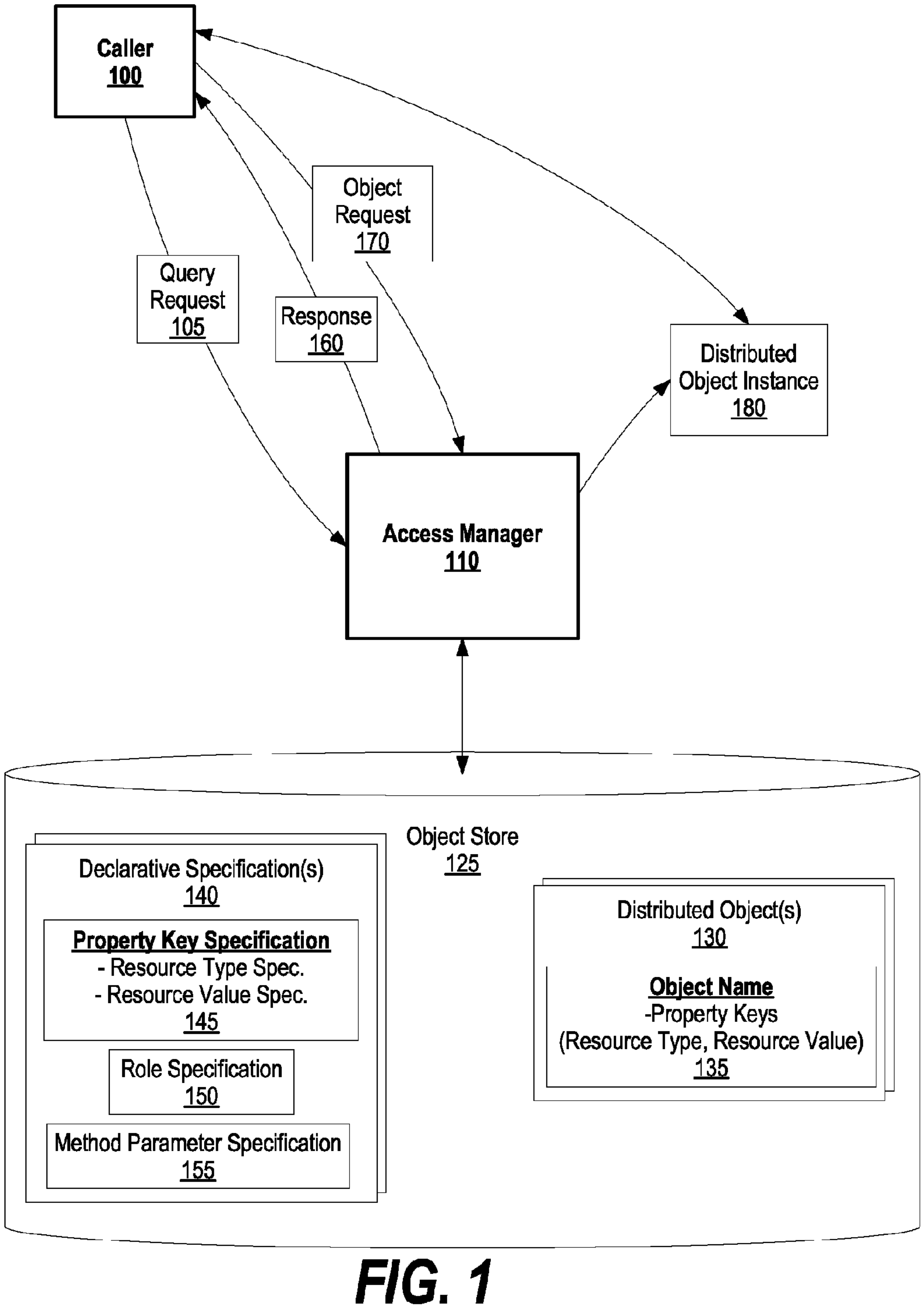
FIG. 1 is a diagram showing an access manager enforcing instance based security using declarative specifications and property keys.

FIG. 1 is a diagram showing an access manager enforcing instance based security using declarative specifications and property keys. Using the invention described herein, security logic is included in declarative specifications and, as a result, policies are decoupled from distributed object administration logic.

Caller 100 sends query request 105 to access manager 110. Access manager 110 manages access to distributed object(s) 130 included in object store 125. Each distributed object includes an object name, such as object name 135, that includes one or more property keys. The property keys are used in combination with a corresponding declarative specification (declarative specification 140) to determine whether to create an instance of distributed object 130 (distributed object instance 180) and allow caller 100 to invoke a method on distributed object instance 180 (see FIG. 2A and corresponding text for further details).

Access manager 110 receives query request 105, and sends response 160 to caller 100 that includes object name properties corresponding to query request 105. In turn, caller 100 sends object request 170 to access manager 110, which is a call to request access to a particular distributed object. For example, object request 170 may include "invoke (server1ObjectName, "start") in object request 170 to start a server for server1.

Access manager 110 receives object request 170 and identifies a corresponding distributed object and object name (distributed object 130 and object name 135). Access manager 110 selects corresponding declarative specification 140, and extracts property key specification 145 from declarative specification 140. Property key specification 145 includes resource type specifications and resource value specifications that are used to determine requirements of caller 100.

Access manager 110 extracts property keys from object name 135, and identifies access requirements by combining property key specification 145 with the property keys. Once access manager 110 identifies the access requirements, access manager 110 compares caller access attributes of caller 100 against the identified access requirements to determine whether to grant access to a requested distributed object. Access manager 110 may also use role specification 150 and/or method parameter specification 155 as access requirements (see FIGS. 3A, 3B, and corresponding text for further details). When access manager 110 grants access, access manager 110 invokes distributed object instance 180, which is an instance of distributed object 130, and allows caller 100 to invoke a method on distributed object instance 180 (See FIGS. 7-9 and corresponding text for further details).

FIG. 2A is an exemplary object name that includes a plurality of property keys, each of which including a resource type and a resource value. Object name 200 includes three property keys that include three resource types, which are "cluster," "server," and "host," along with three corresponding resource values, which are "cluster1," "server1," and "host1." When evaluated with a declarative specification, an access manager uses the property keys to identify access requirements for a corresponding distributed object (see FIGS. 2B, 2C, 3A, and corresponding text for further details).

FIG. 2B is an exemplary declarative specification including one property key specification. Declarative specification 220 includes property key specification 230, which is combined with an object name to determine whether a caller is authorized access to a particular resource. For example, the combination of object name 200 shown in FIG. 2A and property key specification 230 specifies that in order to invoke a method on a corresponding distributed object, the caller must have access to "cluster1" (property key's resource value) of resource type "cluster."

FIG. 2C is an exemplary declarative specification including two property key specifications. Similar to declarative specification 200 shown in FIG. 2A, declarative specification 250 includes property key specifications 260 and 270 that are used to identify access requirements for a caller. For example, the combination of object name 200 shown in FIG. 2A and property key specifications 260 and 270 specifies that in order to invoke a method on a corresponding distributed object instance, the caller must have access to both "host1" of resource type "Machine" and "cluster1" of resource type "cluster."

FIG. 3A is an exemplary declarative specification including property key specifications and role specifications. When a distributed system supports role-based security, a declarative specification, such as declarative specification 300, may include a caller's role as part of the access requirements. A role specification allows a distributed object security infrastructure to ensure that only callers granted a specific role for a particular resource may access a distributed object, such as role specifications 320 and 330.

For example, the combination of object name 200 shown in FIG. 2A and declarative specification 300 specifies that only users having roles "administrator" or "operator" and authorization to "cluster1" of resource type "cluster" may access the distributed object.

FIG. 3B is an exemplary declarative specification including method parameter requirements. When a distributed object includes methods that use resource instances as parameters, a corresponding declarative specification, such as declarative specification 350, may be used to ensure that only users with access to the resources identified by method parameters may access the specific distributed object.

For example, declarative specification 350 includes method parameter specifications 360, 370, and 380, which specify that only users with an "operator" role to "server" resource instances identified by parameters "server1" and server2" may invoke the method "method1" on the distributed object. Meaning, if the value of parameter "server1" is "s1" and the value of parameter "server2" is "s2," the user must have operator role access to servers "s1" and "s2."

FIG. 4 is an exemplary declarative specification including multiple parameter type requirements. When a single resource is identified by more than one parameter, a declarative specification, such as declarative specification 400, may be used to enforce instance based security. For example, declarative specification 400 specifies that a server is identified by combining a "node" parameter value and a "server" parameter value, and that access is determined from the combination of the two parameters. In addition, declarative specification 400 specifies that only users with an "operator" role are allowed access to the distributed object.

FIG. 5A is an exemplary declarative specification showing that no security checks will be performed on behalf of any distributed object. If neither the default behavior, nor the declarative specification is sufficient for the distributed object's implementation, the declarative specification allows for an "escape clause" to disable the security framework from performing any checks, not even default checks. In this situation, it is the distributed object implementation's responsibility to perform all security checks.

Declarative specification 500 specifies that no security checks will be performed on behalf of a corresponding distributed object. Instead, the distributed object performs all the checks internally.

FIG. 5B is an exemplary declarative specification showing that no security checks are to be performed on behalf of a particular distributed object. Declarative specification 525 is similar to declarative specification 500 shown in FIG. 5A with the exception that declarative specification 525 applies to an individual method "method1."

FIG. 5C is an exemplary declarative specification showing a distributed object switching roles. Once a caller is authorized to invoke a method on a distributed object, the distributed object implementation may need to run under a different role on behalf of the caller. For example, a distributed object's method responsible for stopping a server may only require that the caller has an "Operator" role to invoke the distributed object. However, the distributed object itself may invoke other distributed objects that require an "Administrator" role in order to bring the server to a complete stop. Declarative specification 550 includes an example of how a distributed object may switch roles.

FIG. 5D is an exemplary declarative specification showing a distributed object switching roles at a method level. Declarative specification 575 is similar to declarative specification 550 shown in FIG. 5C with the exception that declarative specification 575 applies to an individual method "method1."

FIG. 6 is an exemplary declarative specification including a precedence ordering for determining which rule to apply to a distributed object. When a declarative specification specifies more than one specification, the declarative specification may use precedence ordering in order to decide which specification applies. Declarative specification 600 defines that a specification specified at the distributed object level applies to all methods of the distributed object unless specifically overridden at the method level (method level access requirement). Declarative specification 600 also specifies that "excludeAccessCheck" has priority over other competing specifications at the same level.

Declarative specification 600 also specifies that the default behavior is that the user must have access to the cluster instance identified in the ObjectName of the distributed object before a distributed object instance is invoked. The distributed object method "method1" exhibits this default behavior. Distributed object method "method2" overrides the default behavior such that only a user with access to the server identified by a "serverparam" parameter may invoke "method2". Distributed object method "method3" overrides the default behavior such that it performs security checks internally.

Figure 7:
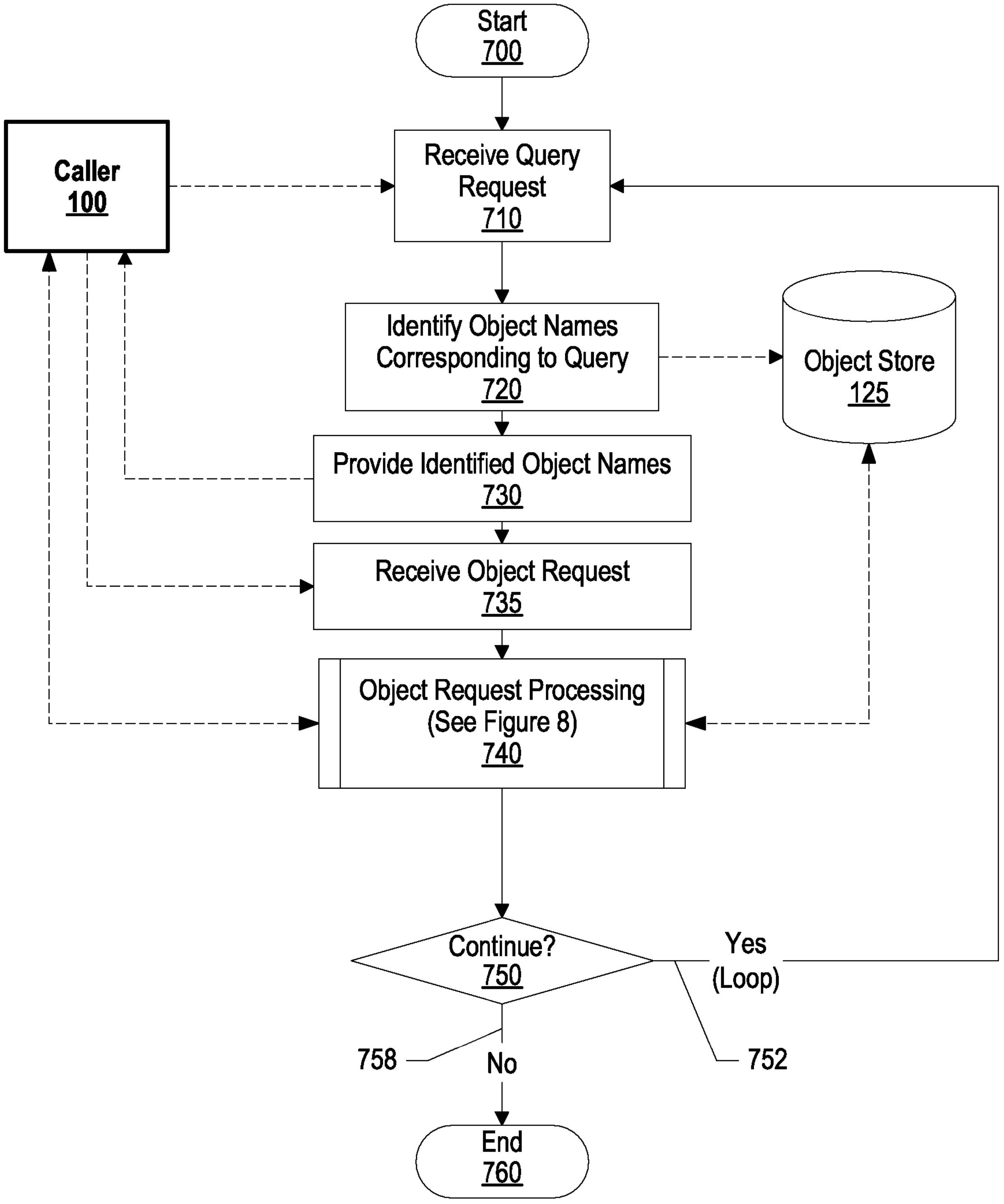
FIG. 7 is a high-level flowchart showing steps taken in processing a distributed object request.

FIG. 7 is a high-level flowchart showing steps taken in processing a distributed object request. Processing commences at 700, whereupon processing receives a query request from caller 100 at step 710. The query request is a query to identify properties corresponding to a particular distributed object. Using JMX Mbeans as an example, caller 100 finds a corresponding object name by sending the query request, which requests properties embedded within the object name. Continuing with this example, an MBean that represents a server may be identified by an object name with the following properties:

cell=cell1,node=node1,server=server1,type=Server

In this example, caller 100 may identify the full name of the MBean's object name sending a query such as "server1ObjectName=query("*,server=server1, type=Server")."

In another example, caller 100 may identify all the MBean's object names included in object store 125 by sending a query "objectnames=query("*")" to access manager 110. In this case, "objectnames" is a list of object names, one for each MBean in the system. Caller 100 is the same as that shown in FIG. 1.

At step 720, processing identifies object names corresponding to the query request that are located in object store 125. Object store 125 is the same as that shown in FIG. 1, and may be stored on a nonvolatile storage area, such as a computer hard drive. At step 730, processing provides the identified object names to caller 100.

Caller 100 sends an object request requesting access to a particular distributed object, which processing receives at step 735. Processing evaluates the object request and invokes a distributed object instance when caller 100's caller access attributes meets identified access requirements (pre-defined process block 740, see FIG. 8 and corresponding text for further details).

A determination is made as to whether to continue to receive requests from caller 100 (decision 750). If processing should continue to receive requests, decision 750 branches to "Yes" branch 752, which loops back to receive and process more queries. This looping continues until processing should terminate, at which point decision 750 branches to "No" branch 758 whereupon processing ends at 760.

Figure 8:
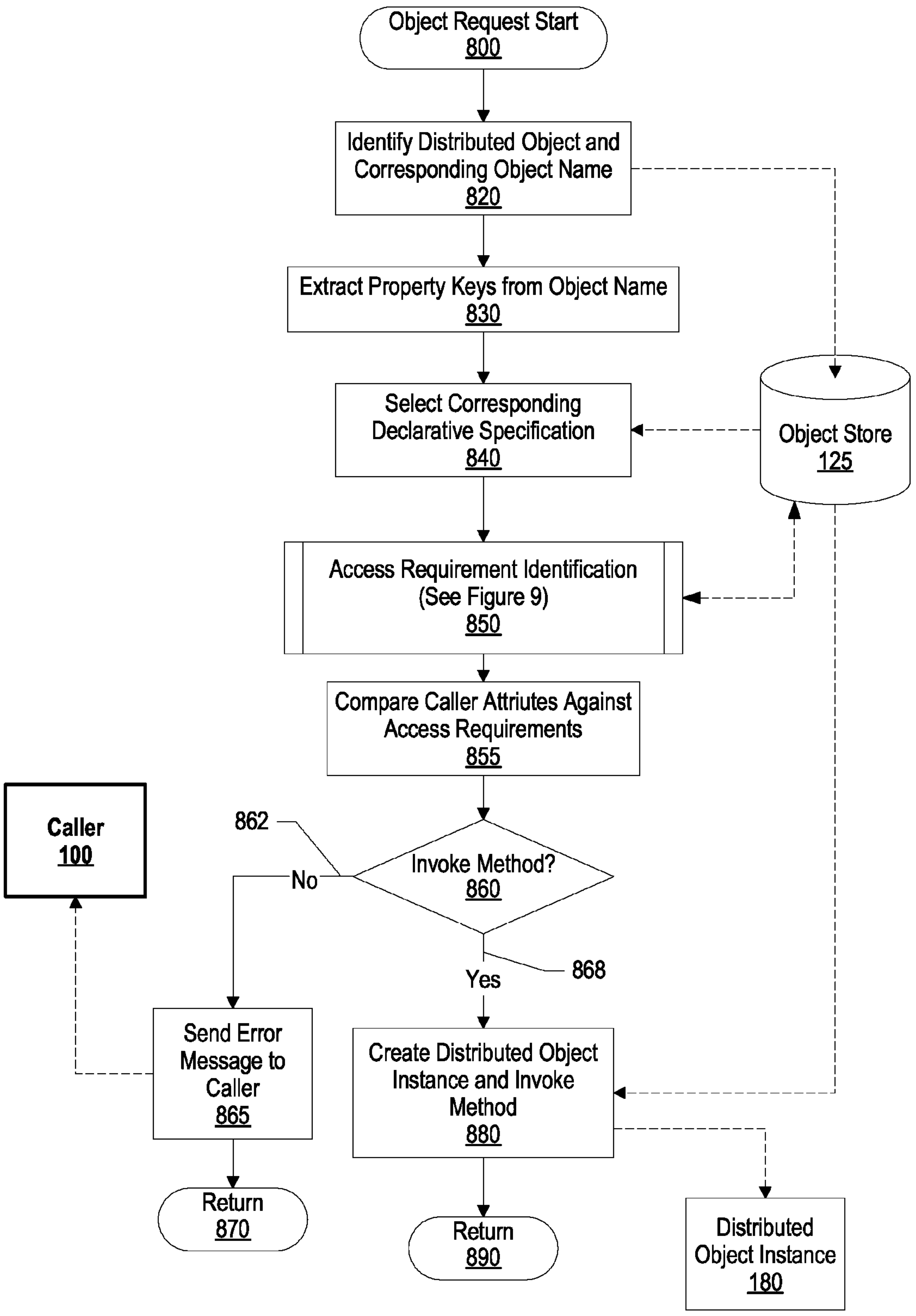
FIG. 8 is a flowchart showing steps taken in creating a distributed object instance for a caller based upon property keys and a corresponding declarative specification.

FIG. 8 is a flowchart showing steps taken in creating a distributed object instance for a caller based upon property keys and a corresponding declarative specification. Processing commences at 800, whereupon processing identifies a requested distributed object and corresponding object name located in object store 125 (step 820). Object store 125 is the same as that shown in FIG. 1. Processing extracts property keys from the object name at step 830. The property keys include resource types and resource values that are used to determine access requirements for the corresponding distributed object (see FIG. 2A and corresponding text for further details).

At step 840, processing selects a declarative specification in object store 125 that corresponds to the requested distributed object. The declarative specification includes a property key specification, and may also include a role specification and/or a method parameter specification. Processing proceeds through a series of steps to identify access requirements based upon the property key's resource types, resource values, and the declarative specification (pre-defined process block 850, see FIG. 9 and corresponding text for further details).

At step 855, processing compares caller access attributes of caller 100 against the identified access requirements. For example, an access requirement may specify that in order to invoke a method on the corresponding distributed object, caller 100 must have attributes to access a resource value "cluster1" of resource type "cluster" (see FIGS. 2B-6, and corresponding text for further details). Caller 100 is the same as that shown in FIG. 1.

A determination is made as to whether to create a distributed object instance for caller 100 based upon the comparision performed at step 855 (decision 860). If processing should not create a distributed object instance, decision 860 branches to "No" branch 862 whereupon processing sends an error message to caller 100 at step 865, and returns at 870.

On the other hand, if processing should create a distributed object instance, decision 860 branches to "Yes" branch 868 whereupon processing invokes distributed object instance 180 for caller 100, which is the same as that shown in FIG. 1 (step 880). In one embodiment, distributed object instance 180 may already exist and, therefore, processing does not perform step 880. Processing returns at 890.

Figure 9:
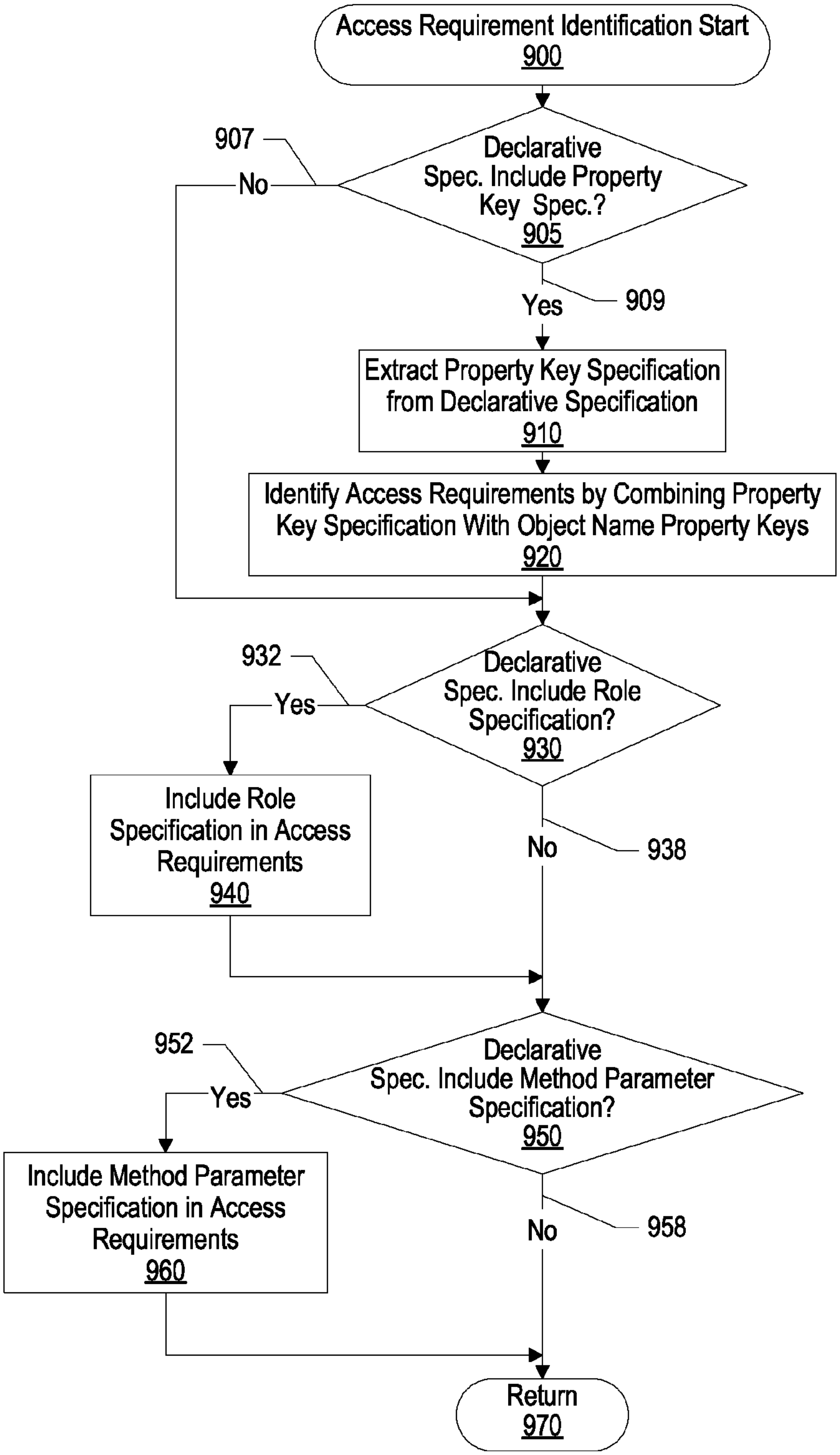
FIG. 9 is a flowchart showing steps taken identifying access requirements for a caller to invoke a method on a distributed object instance and FIG. 10 is a block diagram of a computing device capable of implementing the present invention.

FIG. 9 is a flowchart showing steps taken in identifying access requirements for a caller to invoke a method on a distributed object instance. Processing commences at 900, whereupon a determination is made as to whether a corresponding declarative specification includes a property key specification (decision 905). If the declarative specification does not include a property key specification, decision 905 branches to "No" branch 907 bypassing property key specification analysis steps.

On the other hand, if the declarative specification includes a property key specification, decision 905 branches to "Yes" branch 909 whereupon processing extracts a property key specification from the declarative specification at step 910. The property key specification includes a resource type specification and a resource value specification (see FIGS. 2B through 3A and corresponding text for further details). At step 920, processing identifies access requirements by combining the property key specification with property keys extracted from a distributed object's object name (see FIG. 8 and corresponding text for further details). For example, if the object name was object name 200 shown in FIG. 2A, and the declarative specification was declarative specification 220 shown in FIG. 2B, the access requirement would be that in order to invoke a method on a corresponding distributed object, a caller must have access to "cluster1" of resource type "cluster."

A determination is made as to whether the declarative specification includes a role specification (decision 930). If the declarative specification includes a role specification, decision 930 branches to "Yes" branch 932 whereupon processing includes the role specification as part of the access requirements. On the other hand, if the declarative specification does not include a role specification, decision 930 branches to "No" branch 938.

A determination is made as to whether the declarative specification includes a method parameter specification. If the declarative specification includes a method parameter specification, decision 950 branches to "Yes" branch 952 whereupon processing includes the method parameter specification as part of the access requirements. On the other hand, if the declarative specification does not include a method parameter specification, decision 950 branches to "No" branch 958. Processing returns at 970.

Figure 10:
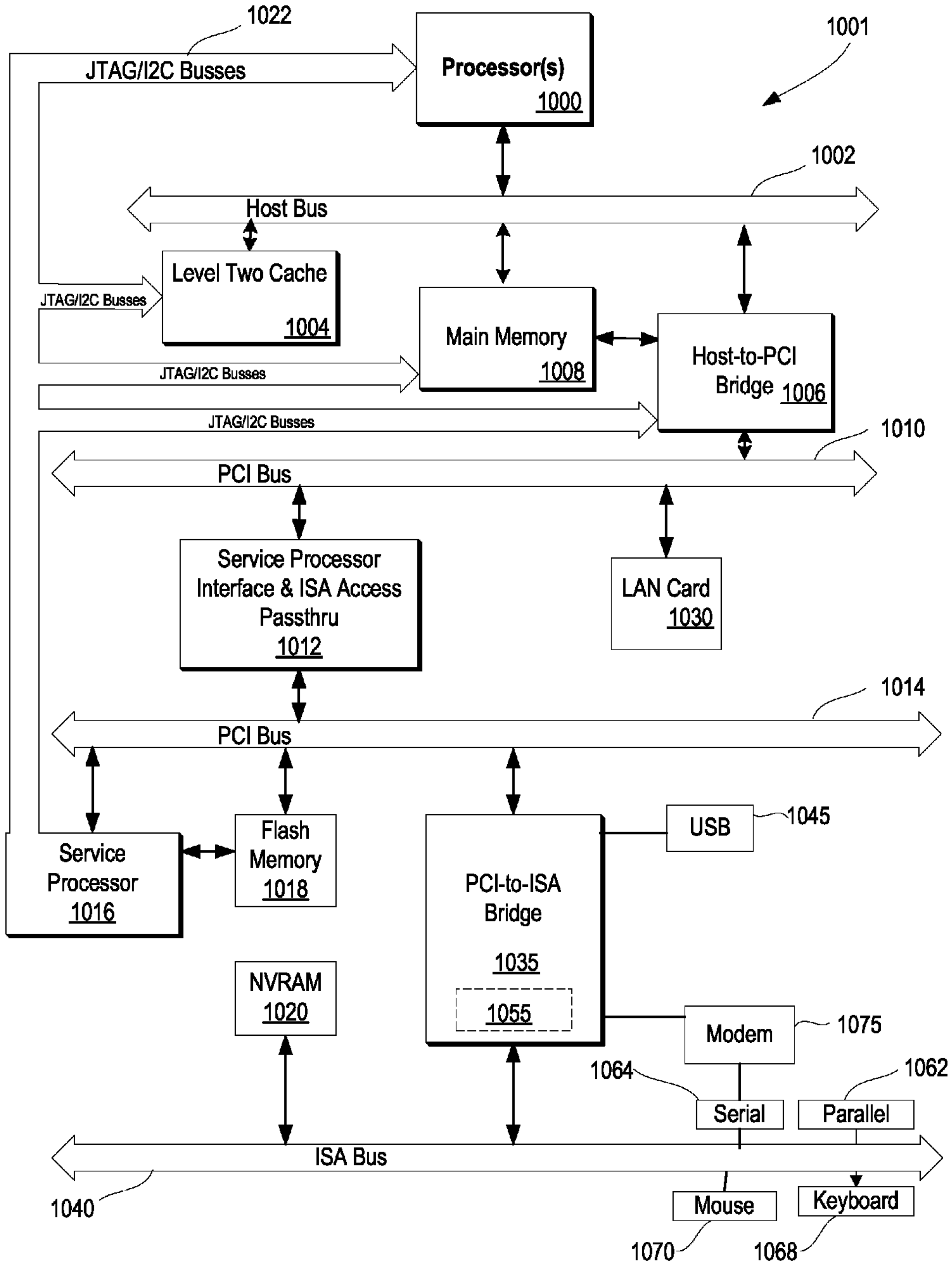

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 1095 is connected to serial port 1064 and PCI-to-ISA Bridge 1035.

While FIG. 10 shows one information handling system that employs processor(s) 1000, the information handling system may take many forms. For example, information handling system 1001 may take the form of a desktop, server, portable, laptop, notebook, or other form factor computer or data processing system. Information handling system 1001 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

receiving, at a computer system, an object request corresponding to a distributed object from a caller;

identifying, by the computer system, an object name corresponding to the distributed object;

extracting, by the computer system, a property key from the object name;

selecting, by the computer system, a declarative specification corresponding to the distributed object, the declarative specification including a property key specification;

identifying, by the computer system, one or more access requirements by combining the property key with the property key specification;

comparing, by the computer system, caller access attributes against the one or more access requirements, the caller access attributes corresponding to the caller; and in response to the comparing, invoking, by the computer system, an instance of the distributed object to the caller based upon determining that the caller access attributes meet the one or more access requirements.

2. The method of claim 1 wherein the declarative specification is decoupled from the distributed object, the method further comprising:

identifying a resource type specification and a resource value specification included in the property key specification;

extracting a resource value and a resource type from the property key; and combining the resource type specification with the resource type and combining the resource value specification with the resource value.

3. The method of claim 1 further comprising:

detecting that the declarative specification includes a role specification; and including the detected role specification in the one or more access requirements, wherein the comparing includes comparing the role specification to a role corresponding to the caller.

4. The method of claim 1 further comprising:

detecting that the declarative specification includes a method parameter specification; and including the detected method parameter specification in the access requirements, wherein the comparing includes comparing the caller access attributes with the method parameter specification.

5. The method of claim 4 wherein the method parameter specification includes a plurality of parameter value specifications, the method further comprising:

combining at least two of the plurality of parameter value specifications, resulting in a combined parameter value specification; and including the combined parameter value specification in the access requirements, wherein the comparing includes comparing the caller access attributes with the combined parameter value specification.

6. The method of claim 1 wherein the property key specification includes a plurality of resource type specifications and a corresponding plurality of resource value specifications, and wherein the object name includes a plurality of property keys, the method further comprising:

identifying a plurality of access requirements by combining the plurality of resource type specifications and resource value specifications to the plurality of property keys; and performing the invoking in response determining that the caller access attributes meets each of the plurality of access requirements.

7. The method of claim 1 further comprising:

detecting that the one or more access requirements are at a distributed object level;

identifying a method level access requirement; and overriding the one or more access requirements with the method level access requirement.

8. A computer program product stored on a computer operable media, the computer operable media containing instructions for execution by a computer, which, when executed by the computer, cause the computer to perform actions that include:

receiving an object request corresponding to a distributed object from a caller;

identifying an object name corresponding to the distributed object;

extracting a property key from the object name;

selecting a declarative specification corresponding to the distributed object, the declarative specification including a property key specification;

identifying one or more access requirements by combining the property key with the property key specification;

comparing caller access attributes against the one or more access requirements, the caller access attributes corresponding to the caller; and in response to the comparing, invoking an instance of the distributed object to the caller based upon determining that the caller access attributes meet the one or more access requirements.

9. The computer program product of claim 8 wherein the declarative specification is decoupled from the distributed object, and wherein the functional descriptive material that, when executed by the computer, causes the computer to further perform actions that include:

identifying a resource type specification and a resource value specification included in the property key specification;

extracting a resource value and a resource type from the property key; and combining the resource type specification with the resource type and combining the resource value specification with the resource value.

10. The computer program product of claim 8 wherein the functional descriptive material that, when executed by the computer, causes the computer to further perform actions that include:

detecting that the declarative specification includes a role specification; and including the detected role specification in the one or more access requirements, wherein the comparing includes comparing the role specification to a role corresponding to the caller.

11. The computer program product of claim 8 wherein the functional descriptive material that, when executed by the computer, causes the computer to further perform actions that include:

detecting that the declarative specification includes a method parameter specification; and including the detected method parameter specification in the access requirements, wherein the comparing includes comparing the caller access attributes with the method parameter specification.

12. The computer program product of claim 11 wherein the method parameter specification includes a plurality of parameter value specifications, and wherein the functional descriptive material that, when executed by the computer, causes the computer to further perform actions that include:

combining at least two of the plurality of parameter value specifications, resulting in a combined parameter value specification; and including the combined parameter value specification in the access requirements, wherein the comparing includes comparing the caller access attributes with the combined parameter value specification.

13. The computer program product of claim 8 wherein the property key specification includes a plurality of resource type specifications and a corresponding plurality of resource value specifications, the object name including a plurality of property keys, and wherein the functional descriptive material that, when executed by the computer, causes the computer to further perform actions that include:

identifying a plurality of access requirements by combining the plurality of resource type specifications and resource value specifications to the plurality of property keys; and performing the invoking in response determining that the caller access attributes meets each of the plurality of access requirements.

14. The computer program product of claim 8 wherein the functional descriptive material that, when executed by the computer, causes the computer to further perform actions that include:

detecting that the one or more access requirements are at a distributed object level;

identifying a method level access requirement; and overriding the one or more access requirements with the method level access requirement.

15. An information handling system comprising:

one or more processors;

a memory accessible by the processors;

one or more nonvolatile storage devices accessible by the processors; and an access management tool for enforcing instance based security, the access management tool being effective to:

receive an object request corresponding to a distributed object from a caller;

identify an object name in one of the nonvolatile storage devices corresponding to the distributed object;

extract a property key from the object name;

select a declarative specification in one of the nonvolatile storage devices corresponding to the distributed object, the declarative specification including a property key specification;

identify one or more access requirements by combining the property key with the property key specification;

compare caller access attributes against the one or more access requirements, the caller access attributes corresponding to the caller; and in response to the comparing, invoke an instance of the distributed object to the caller based upon determining that the caller access attributes meet the one or more access requirements.

16. The information handling system of claim 15 wherein the declarative specification is decoupled from the distributed object, the access management tool further effective to:

identify a resource type specification and a resource value specification included in the property key specification located in one of the nonvolatile storage devices;

extract a resource value and a resource type from the property key; and combine the resource type specification with the resource type and combine the resource value specification against the resource value.

17. The information handling system of claim 15 wherein the access management tool is further effective to:

detect that the declarative specification includes a role specification; and include the detected role specification in the one or more access requirements, wherein the comparing includes comparing the role specification to a role corresponding to the caller.

18. The information handling system of claim 15 wherein the access management tool is further effective to:

detect that the declarative specification includes a method parameter specification; and include the detected method parameter specification in the access requirements, wherein the comparing includes comparing the caller access attributes with the method parameter specification.

19. The information handling system of claim 18 wherein the method parameter specification includes a plurality of parameter value specifications, the access management tool further effective to:

combine at least two of the plurality of parameter value specifications, resulting in a combined parameter value specification; and include the combined parameter value specification in the access requirements, wherein the comparing includes comparing the caller access attributes with the combined parameter value specification.

20. The information handling system of claim 15 wherein the property key specification includes a plurality of resource type specifications and a corresponding plurality of resource value specifications, and wherein the object name includes a plurality of property keys, the access management tool further effective to:

identify a plurality of access requirements by combining the plurality of resource type specifications and resource value specifications to the plurality of property keys; and perform the invoking in response determining that the caller access attributes meets each of the plurality of access requirements.

* * * * *